April 13, 1965 R. L. RENFROE 3,178,219
ERECTION CLAMP
Filed June 27, 1962 5 Sheets-Sheet 1

INVENTOR
Raymond L. Renfroe

BY *Irons, Birch, Swindler & McKie*
ATTORNEYS

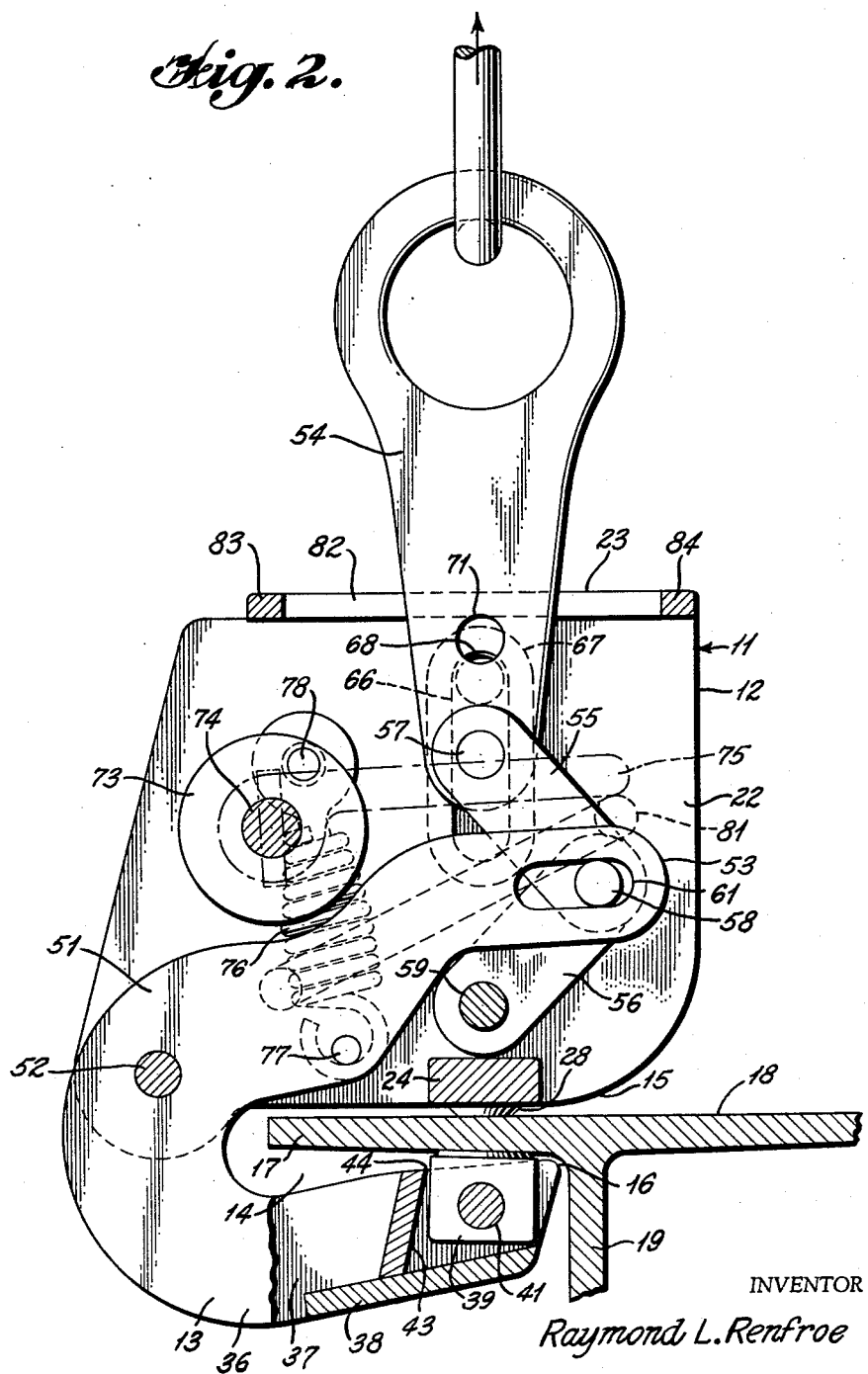

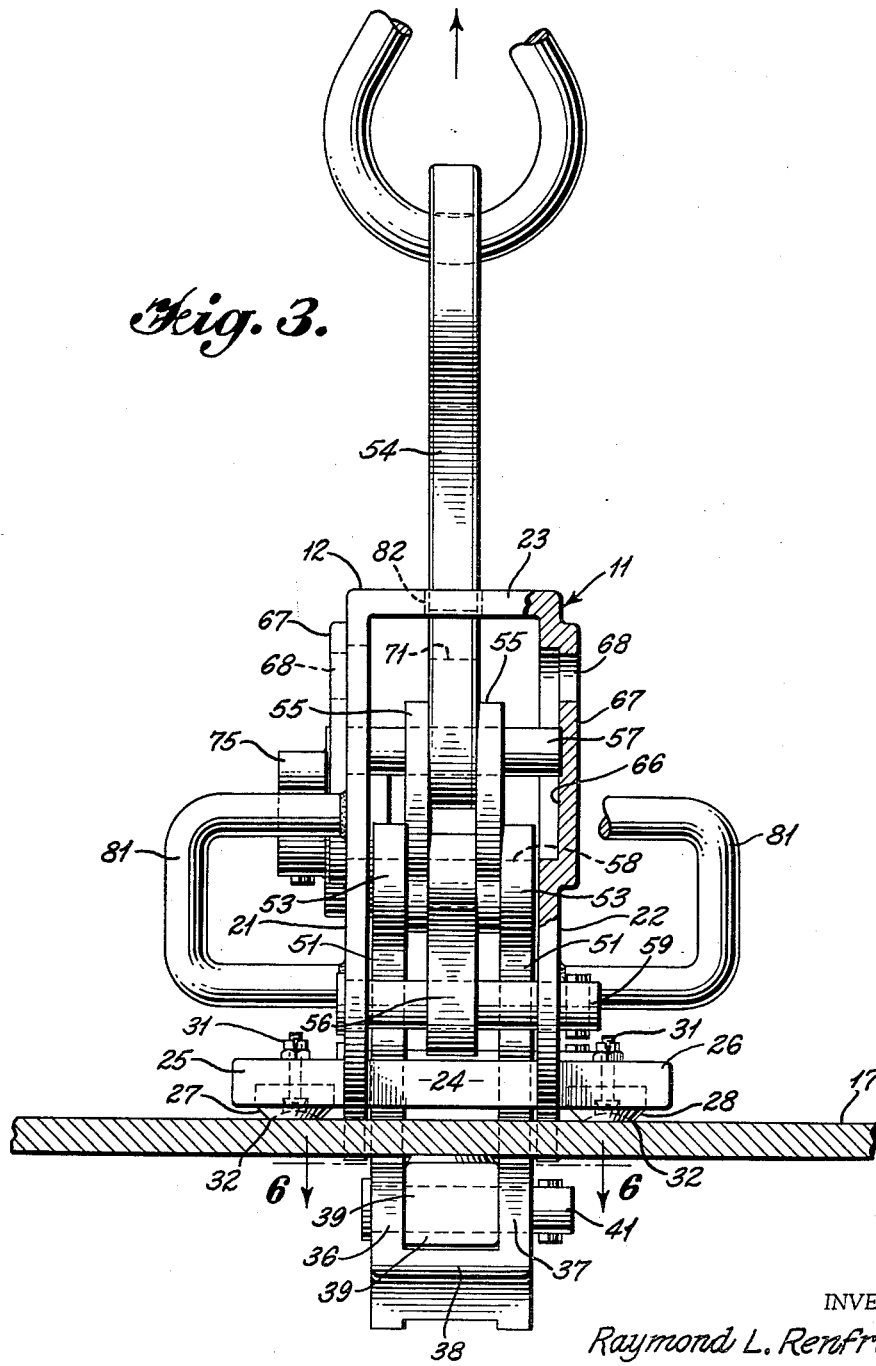

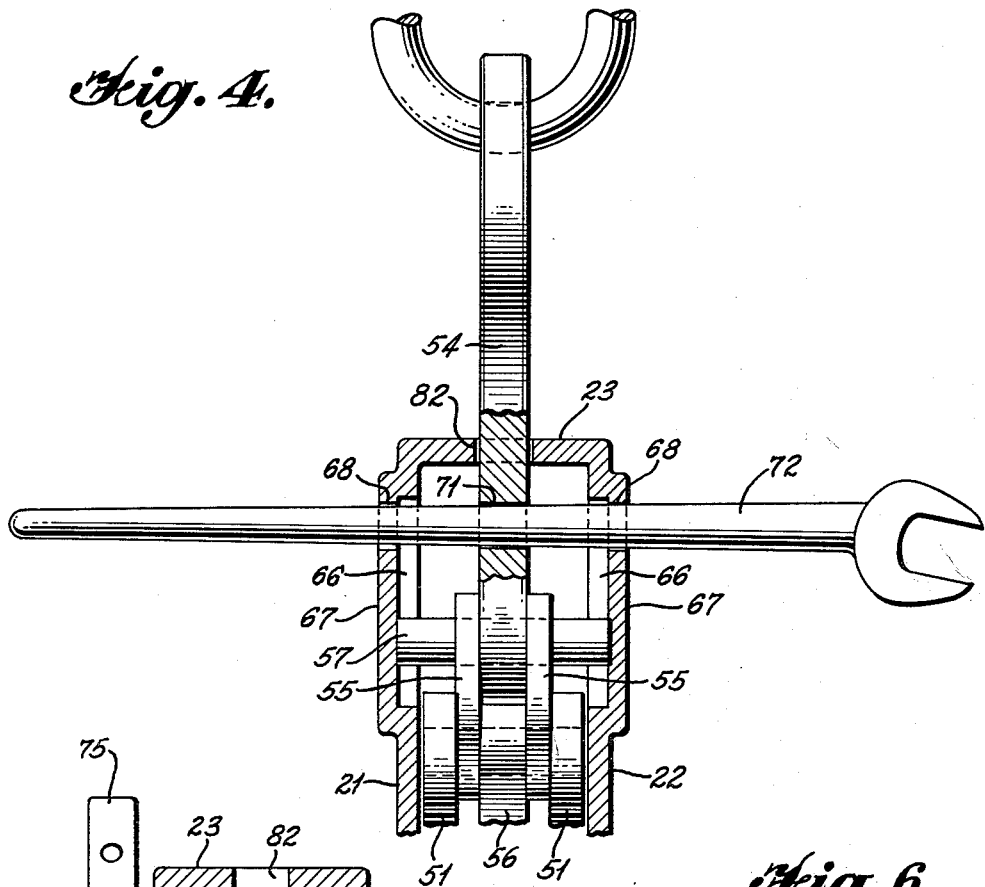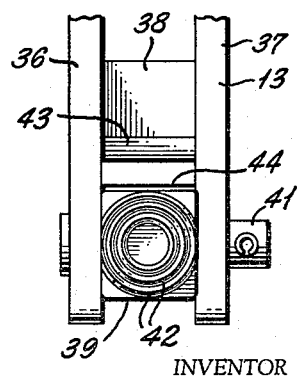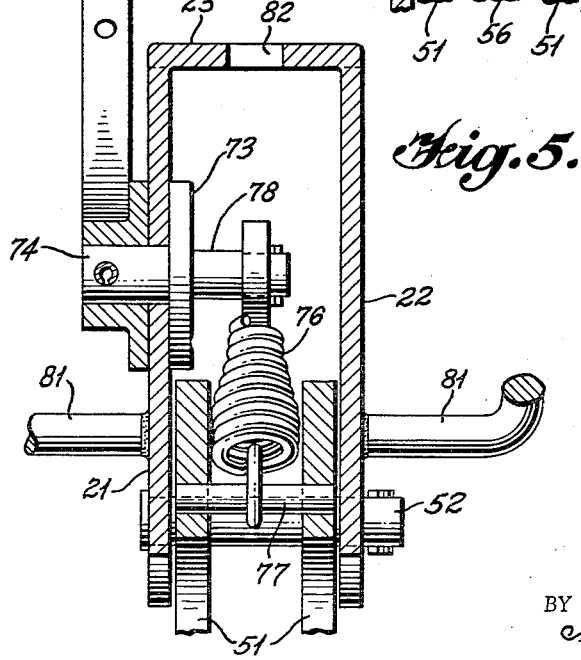

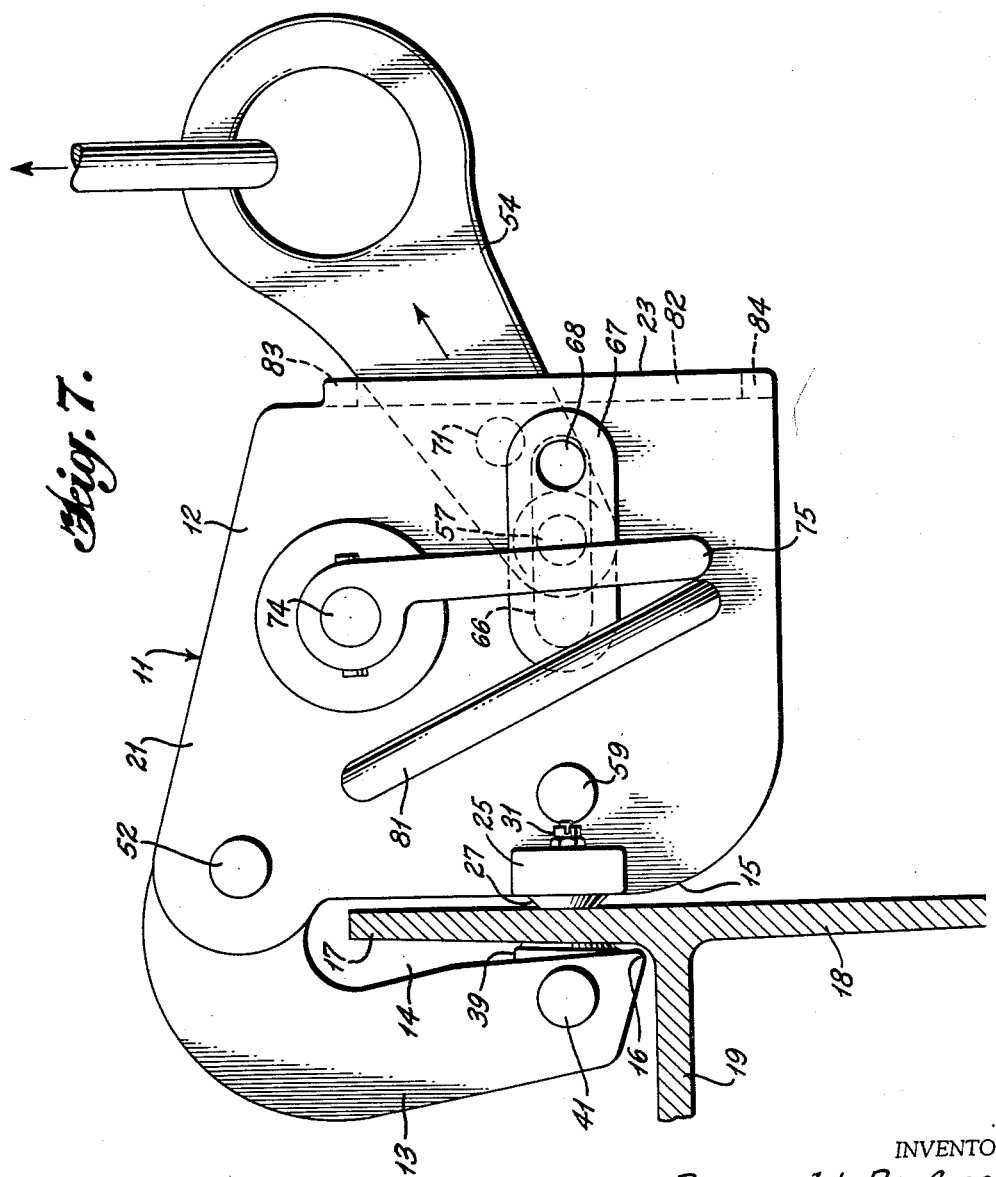

United States Patent Office 3,178,219
Patented Apr. 13, 1965

3,178,219
ERECTION CLAMP
Raymond L. Renfroe, Jacksonville, Fla., assignor to J. C. Renfroe & Sons, Inc., Jacksonville, Fla., a corporation of Florida
Filed June 27, 1962, Ser. No. 205,657
16 Claims. (Cl. 294—104)

This invention relates to clamps for lifting structural members and more particularly for use in the erection of such members in buildings and the like.

In the erection of buildings utilizing a framework of structural members of steel, aluminum or the like, such members must be raised to and held in their final position in the structure until permanent fasteners such as rivets or bolts are emplaced. Such members include I beams, H beams, girders, channels, angles and other structural shapes which are exceedingly heavy and cumbersome to handle. One conventional procedure has involved the use of a cable sling or "choker" to lift the beam or other member to the desired position. Such slings must be wrapped completely around the beam prior to lifting thus requiring at least one end of the member to be preliminarily raised to enable placement of the sling. Moreover, during movement of the beam, the sling loop is subject to slippage which not only is dangerous to personnel and equipment but increases the difficulty of proper placement of the beam. Further, the cable is subject to rapid wear requiring frequent replacement. Consequently the industry has been faced with a great need for a clamp capable of gripping a beam flange to raise the member to the desired position in the structure and hold it there during the emplacement of permanent fasteners. This invention is an improvement over the lifting clamp for use in such an erecting operation disclosed in Robert C. Renfroe application entitled "Lifting Clamp," Serial No. 205,655 filed June 27, 1963.

To overcome the disadvantages of the prior art it is an object of this invention to provide an improved lifting clamp for use in erecting structural beams and other members.

A further object of the invention is to provide such a clamp which securely grips the structural member to enable it to be lifted from any of a variety of initial attitudes and maintain such grip regardless of variations in the attitude of the member while it is being moved.

A more specific object of the invention is to provide such a clamp which grips a structural beam flange near its web on one side only of the beam to lift the beam without substantial canting of the beam web from the vertical.

Yet another object of the invention is to provide such a clamp which may be employed to rotate a beam from a position in which its web is horizontal to a position in which its web is vertical and then to lift the beam in the latter position while maintaining a secure grip on the beam flange throughout the procedure.

The invention relates generally to a clamp for lifting a flanged structural member which comprises a body defining a horizontal slot open along one edge to receive laterally into said slot one side only of a horizontal flange of the structural member to be lifted, said body including upper and lower body portions defining opposed jaw means above and below said slot respectively, said lower body portion having a connecting arm extending laterally around said slot opposite said open edge and pivotally connected to said body portion to open and close said opposed jaw means, and shackle means connected to said upper body portion and said connecting arm to apply a substantial closing force to said jaw means when a vertical lifting force is applied to said shackle means and to retain said closing force when said member is raised by said lifting force. Preferably the jaw means define ridged gripping surfaces which bite into a flange being gripped and at least one of the jaw means comprises a pair of jaws spaced apart longitudinally of the member to be lifted. Desirably the spaced jaws are the upper jaws.

The invention having been generally described a preferred specific embodiment will now be set forth in detail with reference to the accompanying drawings in which:

FIGURE 2 is a vertical sectional view similar to FIGURE 1;

FIGURE 3 is a front elevation of such clamp partially in section;

FIGURE 4 is a fragmentary vertical section showing in detail the mechanism for locking the clamp open;

FIGURE 5 is a vertical section taken along the line 5—5 of FIGURE 1 showing in detail the mechanism for locking the clamp closed;

FIGURE 6 is a horizontal section taken along the line 6—6 of FIGURE 3; and

FIGURE 7 is a side elevation of such clamp mounted on a beam having its web horizontal in position to rotate the beam until the web is vertical and then to lift the beam.

Figure 1:
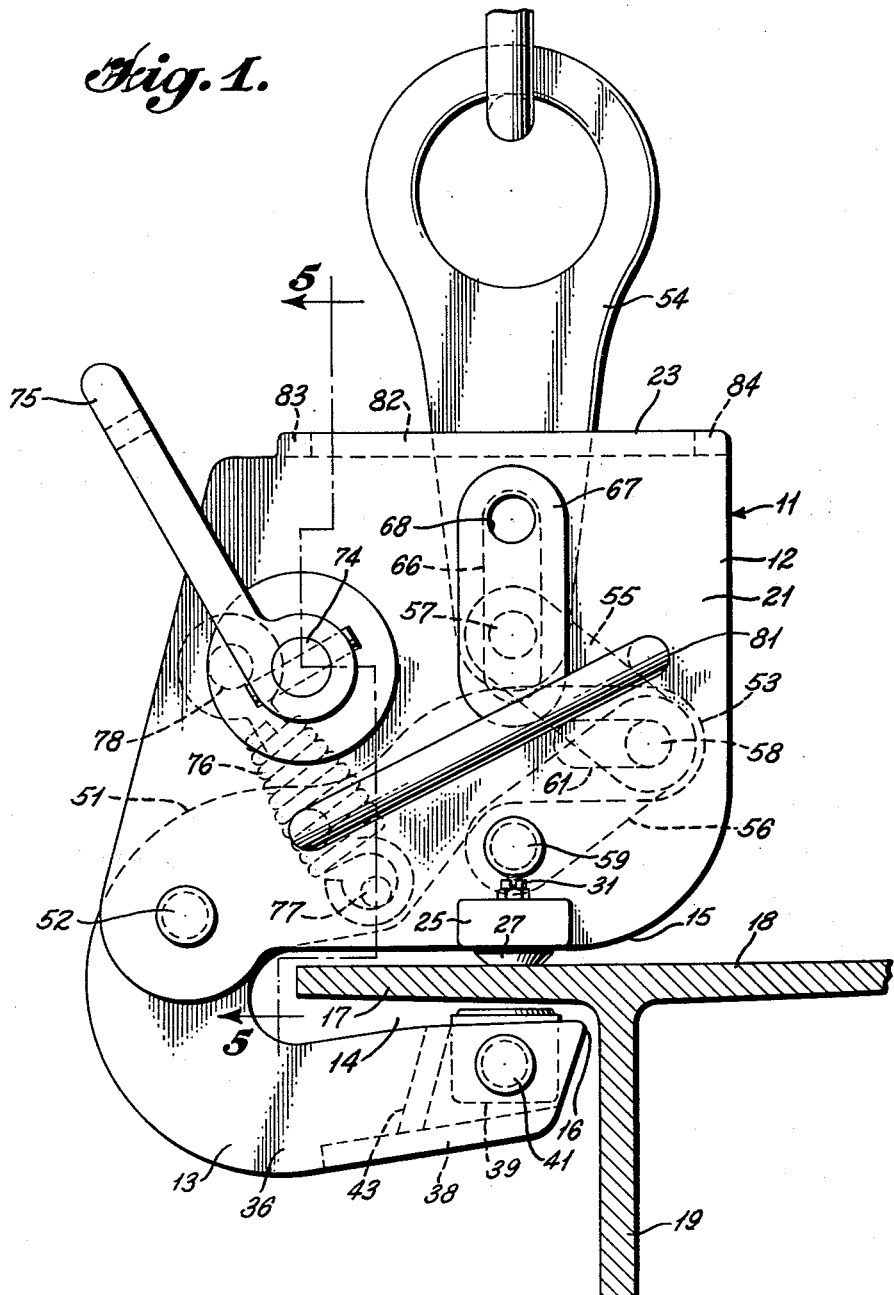
FIGURE 1 is a side elevation of a lifting clamp according to the invention.

Shown in FIGURE 1 is a clamp structure which includes a body 11 having an upper body portion 12 and a lower body portion 13. The body 11 defines between the upper and lower portions 12 and 13 a horizontal slot 14 open along one edge between open lips 15 and 16 to receive laterally into the slot one side only of a horizontal flange 17 of a conventional wide flanged beam 18 having the usual vertical web 19 centrally disposed below the flange and perpendicular thereto. The slot 14 extends completely through the body 11 in a direction longitudinally of the beam 18 to be lifted. The slot should be sufficiently deep to enable the lip 16 to extend to the web of a variety of beams which can be lifted by the clamp.

The upper body portion 12 includes a pair of spaced side plates 21 and 22, an upper plate 23 and a lower cross member 24. The cross member 24 protrudes from both sides of the upper body portion 12 to form a pair of wings 25 and 26. Mounted in the lower face of each of the wings 25 and 26 outwardly of the plates 21 and 22 respectively are a pair of gripping jaws 27 and 28. Each of the jaws 27 and 28 is connected to its respective wing by a threaded fastener 31 which permits the jaw to swivel about its own axis but precludes movement of such jaw along such axis. The surface of each of the jaws 27 and 28 is characterized by a protruding sharp annular ridge 32 (FIGURE 3) which bites into the surface of the flange of the beam being lifted.

The lower body portion 13 includes a pair of spaced side plates 36 and 37 connected by a bottom cross member 38. Pivotally connected between the spaced plates 36 and 37 is a lower jaw 39. A pivot pin 41 extends through the jaw 39 and the side plates 36 and 37 in a direction longitudinally of the member to be lifted and across the slot 14. The jaw 39 is also characterized by sharp annular ridges 42 (FIGURE 6) which bite into the underside of the flange 17. As best illustrated in FIGURE 2, the lower jaw 39 may be pivoted about the pin 41 to raise the back edge of the jaw (i.e., the edge furthest from the open lips 15 and 16) to permit the ridged gripping surface to conform to the usual outward taper on the underside of the flange 17 of a conventional wide flanged beam or I beam. Attached as by welding between the plates 36 and 37 is a cross bar 43 the front upper corner of which functions as a stop to restrict the backward rotation of the jaw 39. Preferably when the jaw 39 engages the corner 44 the gripping surface of the jaw is substantially horizontal. Thus, the stop precludes the front upper corner of the jaw 39 from being raised into the slot 14 substantially above the normal level of the jaw surface to prevent interference with the insertion of the flange 17 into the slot 14. The cross bar 43 also restricts the rotation of the jaw 39 in the opposite or forward direction but permits sufficient rotation in that direction to enable the jaw to compensate for the usual range of tapers in the flanges of a variety of beams with which the clamp is to be employed. It will be understood that the clamp may lift a wide variety of structural shapes including without limitation wide flanged beams, I beams, H beams, T beams, channels, angles and the like.

Integral with the lower body portion 13 is a connecting arm 51 which extends laterally around the slot 14 opposite the open edge of the slot and between the plates 21 and 22 of the upper body portion 12. The connecting arm 51 comprises a pair of spaced plates and is pivotally connected to the upper body portion by a pivot pin 52. Thus the raising and lowering of the outer end 53 of the upper portion of the connecting arm 51 results in closing and opening of the jaws respectively. A shackle 54 is connected to the upper body portion 12 and to the connecting arm 51 to apply a substantial closing force to the jaws when a vertical lifting force is applied to the shackle and to retain such closing force when the beam 18 is lifted by such lifting force. Specifically, a toggle linkage which includes a pair of links 55 and 56 is connected between the shackle 54 and the upper body portion 12. As shown in FIGURE 3 the link 55 comprises a double strap and the link 56 is a single strap. The lower end of the shackle is pivotally connected to the upper end of the link 55 by a pivot pin 57. The lower end of the link 55 is pivotally connected by a pivot pin 58 to the upper end of the link 56. In turn the lower end of the link 56 is connected by a pivot pin 59 which extends between the plates 21 and 22 of the upper body portion 12. The pin 59 is fixed against movement transverse to its axis relative to the upper body portion 12. The pivot pin 58 is also connected to the outer end 53 of the connecting arm 51 by extending through an elongated slot 61 in such outer end of the connecting arm. Thus when a lifting force is applied to the shackle 54 the pin 57 moves upwardly and the pin 58 moves upwardly and inwardly. The latter slides along the slot 61 and imparts an upward movement to the connecting arm 51 thereby applying a substantial closing force to the jaws. The closing force is applied upwardly to the jaw 39 through the connecting arm 51 and downwardly to the jaws 27 and 28 through the pin 59 and the upper body portion 12. Preferably, the length and arrangement of the individual members making up the linkage between the shackle 54 and the jaws is such that a lifting force on the shackle is multiplied into a greater gripping force on the jaws. It can be seen that the length of the effective lever arm of the connecting arm 51 between the pin 52 and the pin 58 is increased by extending the end of the arm 51 past the pins 57 and 59 with the toggle links 55 and 56 extending to the front rather than the rear of the clamp. Thus the pins 52 and 58 are located on opposite sides of the line between pins 57 and 59.

An elongated vertical slot 66 extends into the inside face of each of the plates 21 and 22 to provide a vertical guide for the shackle pin 57. Desirably a reinforcing pad 67 is attached to the exterior surface of each of the plates 21 and 22 to cover the slot 66. An opening 68 extends through each of the reinforcing pads 67 in alignment with the upper end of the slot 66. In normal use, however, when the shackle is in its uppermost position the shackle pin 57 remains below the opening 68. When the pins 52 and 59 are removed, however, the shackle pin 57 may be lifted into alignment with the opening 68 and removed.

An opening 71 extends through the shackle 54 in such a position as to be in alignment with openings 68 in the plates 21 and 22 when the shackle is in its lowermost position with the jaws open. In such position of the shackle a drift pin such as that provided by the conventional handle of a spud wrench 72 (FIGURE 4) may be inserted through the openings 68 and the shackle opening 71 to lock the clamp with its jaws in open condition. Thus the presence of the drift pin provides a visual warning that the clamp is in a lock open condition.

Provision is also made to lock the clamp with the jaws in closed position. Specifically a circular disc 73 is pivotally connected on the interior face of the plate 21 by a pivot pin 74 which extends through an opening in the plate 21. A locking lever 75 is fixed to the portion of the pin 74 which protrudes outside of the plate 21. A powerful tension spring 76 is connected between a pin 77 on the connecting arm 51 and a pin 78 which is eccentrically mounted on the disc 73. The pin 77 is situated on the connecting arm 51 between the pivots 52 and 58. Thus, when the locking lever 75 is rotated to a position as shown in FIGURES 2 and 7 the eccentric pin 78 is situated high on the disc 73 and to the right of the pin 74 as viewed in FIGURE 2. In that position the outer end of the lever 75 engages one end of a handle 81 mounted on the outside of the plate 21. Since the eccentric pin 78 is in an overcenter condition with respect to the pin 74 the spring 76 holds the lever in a locked condition and at the same time applies a substantial upward force to the connecting arm 51 thereby applying a substantial resilient closing bias to the jaws. When the lever 75 is rotated in a counterclockwise direction as viewed in FIGURES 2 and 7 until the eccentric pin 78 passes dead center with respect to pin 74 the spring 76 then pulls the lever toward an open position as shown in FIGURE 1. In this position of the lever the closing bias is removed from the jaws which are then permitted to be freely rotated to an open condition. With reference to FIGURE 2, the locking lever 75 is in a substantially horizontal position when the jaws are locked closed. Thus, when the beam is situated as shown in FIGURE 2 with the flange horizontal and the web vertical an operator can stand on the top of the flange and unlock the lever by applying a vertically upward force thereto. Such arrangement of the lever is an important safety factor because if the operator were required to apply an opening force to the lever in a direction transverse to the plane of the beam web such exertion would tend to throw him sideways off of the beam.

The handles 81 are positioned on the outside of each of the plates 21 and 23 so that the operator may conveniently grasp them to hold the clamp with the slot horizontal in mounting the clamp on or removing it from a beam flange.

The top plate 23 of the upper body portion 12 is provided with an elongated slot 82 which extends in a direction parallel to the plane of the body 12 and perpendicular to the plane of the web of a beam being lifted. The shackle 54 is freely pivotable about its mounting pin 57 for movement along the slot 82. The ends 83 and 84 of the top plate beyond the ends of the slot 82 provide stops to limit the travel of the shackle along the slot.

In operation, the clamp with the locking lever 75 in an unlocked position may be mounted on the flange 17 of a beam 18 when the flange is horizontal and the web of the beam is vertical as shown in FIGURE 1. The edge of the beam flange is inserted into the slot 14 and the clamp is moved toward the beam web as far as possible until the lip 16 is against or close to the web 19 as shown in FIGURE 1. The locking lever 75 is then rotated in a clockwise direction as shown in FIGURE 1 to a position as shown in phantom in FIGURE 2 to cause a closing bar to be applied to the jaws. With the beam 18 in such a horizontal attitude and a vertical lifting force applied to the shackle 54 the latter moves upwardly to apply a further closing force through the force multiplying linkage to the jaws. Continued lifting force on the shackle results in the raising of the beam off of the ground or other supporting surface.

As best seen in FIGURES 1 and 2 the jaws 27, 28 and 39 and the shackle 54 are all in alignment close to the outer end of the lower body portion 13 which is close to the beam web 19. Thus, the lifting force is applied in substantial vertical alignment with the web which lies at the center of gravity of the beam so that the beam is lifted without substantial canting of the web from the vertical. It is also significant that the movement of the jaws is such that they do not lose any of their gripping force if the beam does tip so as to cant the web from the vertical. It would be undesirable if such canting exerted a force on the jaws tending to open them.

The vertical slot 66 maintains the movement of the shackle pin 57 in a vertical direction perpendicular to the horizontal slot 14. Thus the shackle remains substantially in vertical alignment with the center of gravity of the load and further minimizes the possibility of canting of the beam web from the vertical. This is true regardless of variations in the thickness of the beam flange being gripped which results in corresponding variations in the position of the shackle pin in the guide slot 66.

Usually only one clamp would be employed at the longitudinal center of gravity of the beam on one side of the flange only. Alternatively, as many clamps as desired may be attached to different points along the beam flange. Where beams with particularly wide flanges are handled clamps may be mounted on opposite sides of the web.

The beam is then lifted to its final position in the structure where attaching means such as bolts or rivets are emplaced to retain the beam in such position. An operator then walks out on the beam flange and rotates the locking lever in a counterclockwise direction to the position as shown in FIGURE 1. The initial force applied by the operator to the locking lever is a straight vertical lifting force which has no tendency to throw the operator laterally off of the beam. Preferably the clamp is locked open by the handle of a spud wrench or the like prior to removal by the operator from the beam flange.

Where the beam 18 is positioned horizontally with its web in a horizontal attitude as shown in FIGURE 7 the clamp may be positioned in the same manner previously described except that the slot 14 is oriented in a vertical position with its open edge pointed downwardly and with the shackle extending outwardly away from the top of the beam. With the clamp so mounted on the beam, the jaws may be locked in a closed position as previously described and a lifting force is applied to the shackle in the direction shown by the arrow in FIGURE 7. Such force causes the shackle first to rotate about the pin 57 until the inclined edge of the shackle strikes the stop 83. The exertion of further lifting force on the shackle causes it to slide outwardly along the stop 83 and to be rotated about the stop 83 as a fulcrum to move the pin 57 outwardly thereby causing the jaws to close to grip the beam flange. Continued lifting rotates the beam to raise its web to a vertical attitude as shown in FIGURE 1. Then a vertical lifting force may be applied to the clamp in the usual manner to raise the beam with its web in a vertical attitude.

There has been illustrated and described what is considered to be a preferred embodiment of the invention. It will be understood, however, that various modifications may be made by persons skilled in the art without departing from the scope of the invention which is defined solely by the appended claims.

I claim:

1. A clamp for lifting a flanged structural member which comprises a body defining a horizontal slot open along one edge to receive laterally into said slot one side only of a horizontal flange of the structural member to be lifted, said body including upper and lower body portions defining opposed jaw means above and below said slot respectively, said lower body portion having a connecting arm connected to said lower jaw means and extending laterally around said slot opposite said open edge and above said slot, said arm being pivotally connected to said upper body portion to open and close said opposed jaw means, and shackle means connected to said upper body portion and said connecting arm to apply a substantial closing force to said jaw means when a vertical lifting force is applied to said shackle means and to retain said closing force when said member is raised by said lifting force, said connections between said shackle means and said body portion and said connecting arm being located to cause said lifting force to be applied in substantial vertical alignment with said jaw means.

2. A lifting clamp according to claim 1 wherein said upper and lower jaw means define ridged gripping surfaces which bite into a flange being ripped.

3. A lifting clamp according to claim 2 wherein at least one of said jaw means comprises a pair of jaws spaced apart longitudinally of the member to be lifted.

4. A lifting clamp according to claim 2 wherein said upper jaw means comprises a pair of jaws spaced apart longitudinally of the member to be lifted.

5. A lifting clamp according to claim 2 wherein said lower body portion has its jaw means pivotally connected to conform to a taper on the underside of the flange of the member being lifted.

6. A lifting clamp according to claim 5 wherein stop means is provided to limit the pivotal movement of said lower jaw means to prevent interference with the insertion of the flange into said slot.

7. A clamp for lifting a flanged structural member which comprises a body defining a horizontal slot open along one edge to receive laterally into said slot one side only of a horizontal flange of the structural member to be lifted, said body including upper and lower body portions defining opposed jaw means above and below said slot respectively, said lower body portion having a connecting arm connected to said lower jaw means and extending laterally around said slot opposite said open edge and above said slot, said arm being pivotally connected to said upper body portion to open and close said opposed jaw means, a shackle movably mounted in said upper body portion, linkage means connecting said shackle to said connecting arm and said upper body portion to apply a substantial closing force to said jaw means when a vertical lifting force is applied to said shackle and to retain said closing force when said member is raised by said lifting force, said connections between said linkage and said shackle, and said connecting arm and said upper body portion being located to cause said lifting force to be applied directly above the contact points of said jaw means.

8. A lifting clamp according to claim 7 wherein said upper and lower jaw means define ridged gripping surfaces which bite into a flange being gripped and further comprising releasable lock means to apply a resilient closing bias to said jaw means.

9. A lifting clamp according to claim 8 wherein at least one of said jaw means comprises a pair of jaws spaced apart longitudinally of the member to lifted.

10. A lifting clamp according to claim 8 wherein said upper jaw means comprises a pair of jaws spaced apart longitudinally of the member to be lifted.

11. A clamp for lifting a flanged structural member which comprises a body defining a horizontal slot open along one edge to receive laterally into said slot one side only of a horizontal flange of the structural member to be lifted, said body including upper and lower body portions defining opposed jaw means above and below said slot respectively, said lower body portion having a connecting arm connected to said lower jaw means and extending laterally around said slot opposite said open edge and above said slot, said arm being pivotally connected to said upper body portion to open and close said opposed jaw means, a shackle mounted for vertical movement in said upper body portion, a toggle linkage having an upper pivotal connection to said shackle, a lower pivotal connection to said upper body portion and an intermediate pivotal and slideable connection to said connecting arm to apply a substantial closing force to said jaw means when a vertical lifting force is applied to said shackle and to retain said closing force when said member is raised by said lifting force, said connections between said linkage and said shackle, said connecting arm and said upper body portion being located to cause said lifting force to be applied in substantial vertical alignment with said jaw means.

12. A lifting clamp according to claim 11 wherein vertical guide means are provided in said upper body portion to retain said upper pivotal connection in a vertical path of movement.

13. A lifting clamp according to claim 12 wherein said shackle is rotatable about said upper pivotal connection in a direction perpendicular to the longitudinal axis of the beam to be lifted and stop means is connected to said upper body portion in a position horizontally spaced from said guide means in a direction opposite to that in which the open edge of said slot is pointed to limit said pivotal movement of said shackle and to act as a fulcrum about which said shackle may pivot and along which said shackle may move to force said upper pivot to move up along said guide means to close said jaws in response to the application of force to said shackle in the direction of said stop means.

14. A lifting clamp according to claim 11 wherein the pivotal connections of said connecting arm to said upper body portion and said toggle linkage respectively are laterally spaced apart on opposite sides of said upper and lower pivotal connections.

15. A clamp for lifting a flanged structural member which comprises a body defining a horizontal slot extending longitudinally through said body and open lips through which a flange of a structural member may be received laterally into said slot; said body including an upper body portion above said slot, a lower body portion below said slot and connecting means extending laterally around said slot opposite said open lips; said upper and lower body portions having opposed jaws above and below said slot respectively, said jaws having ridged gripping surfaces which bite into the surface of the flange; said lower jaw being pivotably mounted in said lower body portion about a horizontal axis extending longitudinally of the member to be lifted so that its gripping surface can conform to an outward taper on the underside of the flange; at least one of said jaws being movable relative to the other jaw to open and close said jaws; and a lifting connection attached to said movable jaw to apply a closing force to said jaws when a lifting force is applied to said lifting connection, said lifting connection being located to cause said lifting force to be applied directly above the contact points of said jaws.

16. A lifting clamp according to claim 15 wherein stop means is provided to limit the pivotal movement of said lower jaw to prevent interference with the insertion of the flange into said slot.

References Cited in the file of this patent
UNITED STATES PATENTS

| | | |
|---|---|---|
| 1,760,885 | Prelesnik | June 3, 1930 |
| 2,654,630 | Renfroe | Oct. 6, 1953 |
| 2,676,838 | Gardner | Apr. 27, 1954 |